United States Patent [19]

Barmore

[11] 4,009,634
[45] Mar. 1, 1977

[54] TOGGLE FASTENING DEVICE AND PROCESS FOR ITS MANUFACTURE

[76] Inventor: Thomas C. Barmore, 4 N. 127 Verrill, Addison, Ill. 60101

[22] Filed: Nov. 14, 1975

[21] Appl. No.: 631,953

[52] U.S. Cl. .................................... 85/3 R; 85/36
[51] Int. Cl.² ........................................ F16B 21/00
[58] Field of Search ............ 85/3 R, 3 K, 3 S, 32 V, 85/36, 80, 81

[56] References Cited

UNITED STATES PATENTS

| | | | |
|---|---|---|---|
| 1,049,376 | 1/1913 | Le Manquais | 85/80 |
| 1,516,242 | 11/1924 | Peirce | 85/3 R |
| 2,224,023 | 12/1940 | Sayen et al. | 85/3 R |
| 2,286,383 | 6/1942 | Ryder | 85/36 |
| 2,430,555 | 11/1947 | Borke | 85/80 |
| 2,430,831 | 11/1947 | Simmons | 85/32 V |
| 2,496,866 | 2/1950 | Flora | 85/36 X |
| 2,532,040 | 11/1950 | Seely | 85/3 R |
| 3,170,361 | 2/1965 | Vaughn | 85/3 R |
| 3,182,367 | 11/1965 | Hamann et al. | 85/36 X |
| 3,532,024 | 10/1970 | Gutshall | 85/3 R X |

Primary Examiner—Roy D. Frazier
Assistant Examiner—Thomas J. Holko
Attorney, Agent, or Firm—Carl C. Batz

[57] ABSTRACT

A toggle type of fastening device which includes a plate in one piece having an opening therein, the edges of the opening being engaged by a screw, the ends of the plate being bendable inwardly toward each other against spring tension to allow the plate to pass through a wall opening and being resilient so that when the plate has passed through the wall opening the ends spread out and prevent the plate from being drawn back out of the wall opening. Another feature is the provision of a rib for added strength and yet another feature is the threaded engagement of the screw with the plate at different levels. The process for manufacturing such a device includes the step of forming the opening in a piece of metal, forming a rib about the opening and then treating the formed piece to make it resilient after it has been deformed.

6 Claims, 9 Drawing Figures

TOGGLE FASTENING DEVICE AND PROCESS FOR ITS MANUFACTURE

This invention relates to a toggle fastening device; and more particularly it relates to such a device in which the toggle structure is in one piece and has an opening therein through which a screw may be passed and wherein the piece is resilient so as to yield to deformation to allow it to be passed through an opening in a wall and then to spring back toward its original shape to prevent its passing back through the wall opening.

BACKGROUND

Fastening devices have long been known for fastening a wide variety of objects to a wall. Some such devices include a bolt or screw which is in threaded engagement with a small nut. They have toggle members extending on each side of the nut which are pivotally connected to the nut so that the outer ends of the toggle members may be moved inwardly and toward each other against the tension of the springs to enable them to be passed through an opening in a wall, and after they have passed through the wall will spread out by action of the springs so that they do not come back through the wall opening. The toggle members may be tightened against the other side of the wall by turning the screw.

The device above described has served the art for many years, but it has many parts and its assembly, especially for providing the pivotal connection of the toggle members and the assembly of the spring, is tedious, making its cost of manufacture greater than would be desirable.

Therefore, I have set myself to the task of providing an improved toggle fastening device which is simpler in construction, has fewer parts, is more economical to produce, and which still has the strength necessary for such a device.

DESCRIPTION

Certain embodiments of my invention are illustrated in the accompanying drawing in which —

Figure 1:
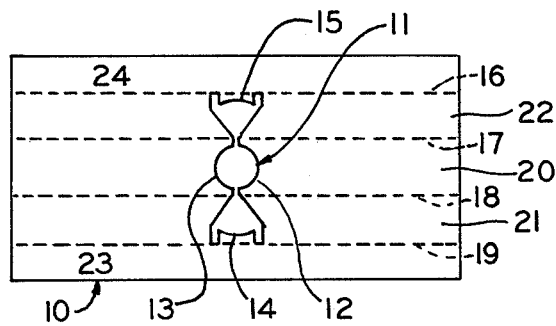
FIG. 1 is the plan view of a metal plate showing an opening which is made in the plate during the course of manufacture.

As illustrated, particularly in FIG. 1, I may start with the flat piece 10, preferably of metal, which I call a plate. The thickness of the plate should be such that it may be conveniently formed or crimped. Preferably, the thickness should not be greater than the pitch, or the longitudinal distance between the high points of adjacent threads on the screw which is to be used with the plate as will later be described. The general shape of the plate may suitably be rectangular.

A first step is to make an opening 11 in the central portion of the plate. The central part of this opening is in circular form and the edge of this central part which is shown as nearest the right end of the plate in FIG. 1 is designated as end edge 12, while the edge of this central part which is shown as nearest the left end of the plate in FIG. 1 is designated as end edge 13.

At its upper part, as shown in FIG. 1, opening 11 may be of any convenient width but need only be a slit, the slit being bifurcated so as to leave a tab 14 at one side; and the lower part of opening 11 may be similar form to leave the tab 15 at the other side. Preferably, the opening about the tabs 14 and 15 should be sufficiently great as to leave some space between the side edges of the tabs 14 and 15 and the panels 21 and 22 which are the sides of the ribs later to be formed. I use the character 11 to designate the entire opening which has the end edges 12 and 13 and the side edges which are formed by the edges of tabs 14 and 15. After the plate is bended, the end edges 12 and 13 are at the top of the rib while the edges of the tabs 14 and 15 are at the base of the rib. As will later be explained more clearly the plate will, in use, be bended at about its longitudinal center portion and in this connection some space between the edge of the tabs and the panels which form the side of the ribs is desirable. The end edges 12 and 13 and the side tabs 14 and 15 are important in the operation of the structure as will later become more clearly apparent.

The dotted lines 16, 17, 18 and 19 in FIG. 1 are meant to designate lines along which the metal is bent to form a rib. The central panel 20, which takes in the central part of opening 11, is raised as by pressing in a die to bend the metal along lines 16 and 19. Panel 20 is the top of the rib so formed; panel 21 is one side of the rib; and panel 22 is the other side of the rib.

Figure 6:
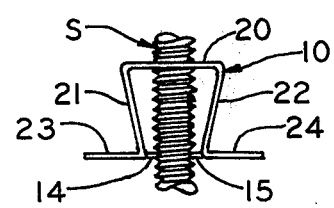
FIG. 6 is an end view showing the engagement of the screw with the sides of the plate opening.

The side panels 23 and 24 may be left in their original plane, or may be turned downwardly at their sides shown more clearly in FIG. 6 of the drawing.

Figure 2:
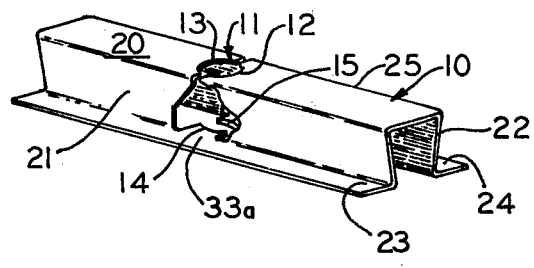
FIG. 2 is a prospective view of the plate after it has been bent to form a rib therein.

In the bending or pressing operation the lines 16 and 19 will be brought closer together. The tabs 14 and 15 will be apart about the same distance as the diameter of the central part of opening 11 or the diameter of the screw which is to be inserted in the plate. FIG. 2 shows the plate after it has been pressed to form the rib 25.

The ends of tabs 14 and 15 and the edges 12 and 13 may be turned so that these edges correspond with the inclined direction of the high points of the threads of the screw which is to be inserted upwardly between edges of the tabs 14 and 15 and between the edges 12 and 13. This may be understood more clearly by reference to FIG. 6 of the drawing. If these edges are not purposely turned to correspond with the screw threads, the threads when turned between these edges itself has the tendency to cause the edges to come into position between the high points of the threads.

I prefer that in the bending operation the side walls of the rib 21 and 22 be made to slant inwardly toward their base as shown more particularly in FIG. 6. This structure causes the downward pressure at edges 12 and 13 to press tabs 15 and 14 toward each other and against the screw which is a desirable effect.

After the rib has been formed the plate 10 may be subjected to treatment to impart to it a spring quality. Such treatments are well known to the art. One type of such treatment is that commonly applied in the manufacture of lock washers. The spring quality referred to means that quality which allows it to take on tension when it is deformed so that when the pressure which causes it to be deformed is relieved it will return at least part way toward its previous shape.

Figure 3:
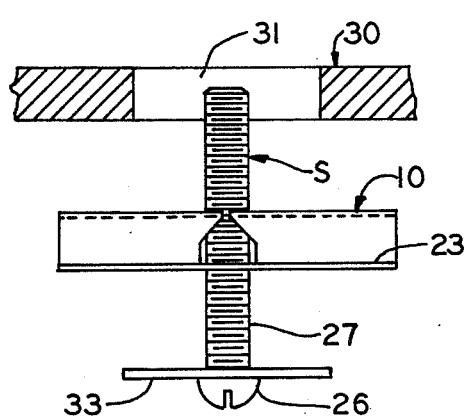
FIG. 3 is a view showing the plate of FIG. 2 after it has been heat treated and a screw inserted therein, ready to be passed through a opening of the wall.

Following the treatment to give the metal plate resiliency or spring quality the screw S, having a head 26 and a threaded shank 27, is inserted into the plate with the threaded shank being passed upwardly into engagement with each of tabs 14 and 15, and as the screw is turned clockwise it passes upwardly and into the central portion of opening 11 with its sides in threaded engagement with the edges 12 and 13 of this opening (see FIG. 6 for example). With this screw inserted, the device may be placed facing the exterior of a wall 30 which contains the opening 31, as shown in FIG. 3. It may be seen that the width of the opening 31 is substantially less than the distance from one end of plate 10 to the other end. I use the term "screw" to mean any type of device having a threaded shank and a head with some means of turning it as by a wrench or screwdriver.

Figure 4:
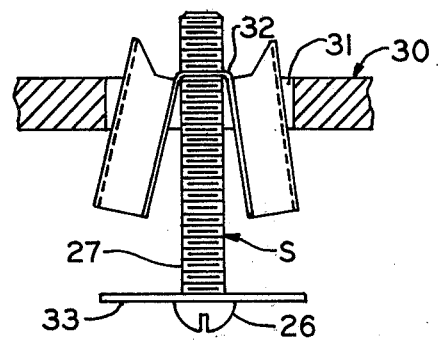
FIG. 4 is a view like FIG. 3 but showing the piece after its end portions have been brought inwardly and during its passage into the wall opening.

FIG. 4 shows the same parts as in FIG. 3 but with the ends having been turned inwardly toward each other so that the plate in its bent condition can pass through the opening 31. As the ends of the plate are moved toward each other the edges 12 and 13 of opening 11 are separated from contact with the screw, and the bending of the plate is principally in the area 32 of panels 23 and 24 (see FIG. 4). Thus the bending against the spring tension of the plate at these areas can easily be done with the fingers.

Figure 5:
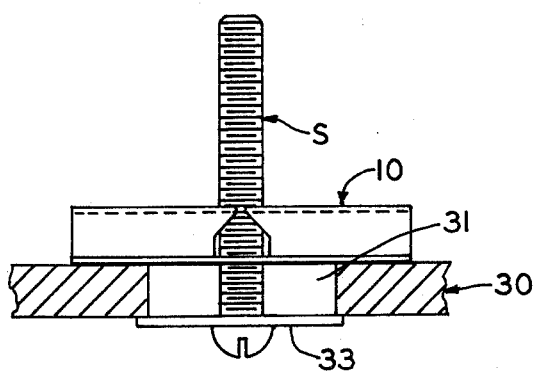
FIG. 5 is a view like FIG. 4 but after the plate has passed through the wall opening and after the plate has again sprung back to its original form and has been tightened against the inside of the wall.

When the plate has passed through the wall opening 31 the spring tension causes the ends of the plate to spring out and upon turning of the screw to tighten it the end portions of the plate align themselves with the inner surface of the wall causing the edges 12 and 13 again to rest against the shank of the screw and in fact to come into threaded engagement with the screw. It may be observed that during the time the ends of the plate were passed toward each other the edges 12 and 13 were not engaged by the screw but the tabs 14 and 15 at the base of the rib continue to be in threaded engagement. When the ends of the plate again return to their outstretched position the screw comes again to be in threaded engagement with the edges 12 and 13 at the top of the rib, and also with tabs 14 and 15 at the base of the rib. The screw may then be turned to bring the plate down tightly against the inside of wall 30 as shown in FIG. 5. As here shown the washer 33 serves as means for preventing the head of the screw from moving through the wall opening. Any objects to be hung on the wall or attached by the fastening device may be fastened under the head of the screw.

I greatly prefer the form of the invention in which the rib is formed because it gives strength to the structure, but when the rib is omitted the structure may be deformed by bending the ends of the plate inwardly to allow it to pass through the wall opening and when it has passed this opening it springs back to its original shape in which it will not come back through the wall opening.

Although I prefer to positively spring-treat the metal plate after it has been formed, it is possible to omit this treatment and to utilize the neutral resiliency of the metal to move the ends of the plate back at least part way to their original shape and then the force of the screw will cause these ends to spread to their original shape in which the end portions are aligned. Even where the natural resiliency of the metal is low it is possible to bring one end of the plate into contact with the inside surface of the wall, and then move the screw to one side which starts the plate end toward its original outstretched position.

Figure 7:
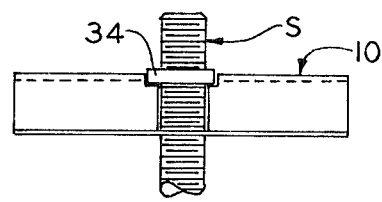
FIG. 7 is a detailed view showing a modified structure of the device.

FIG. 7 shows a modified form of the fastener. In this modification the plate opening about the screw is enlarged to receive the nut 34 between the screw and the edges of this opening. As here shown a square nut is used and it rests down upon the rib sides. Other shapes of nuts could also be used. The edges of the plate opening are cut to fit the outline of the nut be it square or hexagonal or other shape, to prevent turning of the nut when the screw is turned. This modification in which a nut is used could be advatageous where the pressure of the screw in bringing the plate tight against the inside of a wall may be greater than could be tolerated by the edges of the plate openings.

In order to facilitate better engagement between the edges 12 and 13 of the opening with the screw and between the tabs 14 and 15 with the screw, these edges and tabs may be turned at the time the plate is formed so as to be inclined and fit exactly into the grooves between the screw threads.

Figure 8:
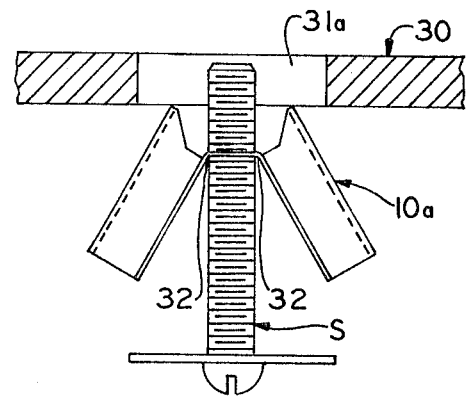
FIG. 8 is a view like FIG. 3 but showing a modified structure of the device.

In the event the opening 31a (FIG. 8) in the wall through which my improved toggle device must pass is relatively small so that in bending the plate to pass it through the opening there is danger of bending the plate beyond the point which can be accommodated by the resilience of the plate, then a modified form of the plate may be indicated. Such a modification may be fabricated by stamping the plate as illustrated in FIG. 1, bending the plate to form the rib as shown in FIG. 2, and then before treating the plate to give it spring-like character bringing the end portions of the plate inwardly into the form 10a shown in FIG. 8. After this is done, the plate can be treated to give it spring character while it is in V-shaped form. Then it may be fitted with a screw and used by inserting it through an opening in a wall as shown in FIG. 8. The advantage of this manufacture is that, being already formed in V shape when it is treated, it stays normally in this form, and when used to pass through the opening in the wall the necessary deformation from its normal state is substantially less. If, for example, the maximum deformation of the end portions of the plate from their normal position which can be permitted without breaking, is 30°, and if these end portions have to be brought inwardly to about 45° in order to pass through the opening, then by having the end portions brought inwardly to about 30° before the spring treatment is applied, these end portions can easily be brought inward another 15° to allow the device to pass the opening without exceeding its maximum deformation of 30°.

Figure 9:
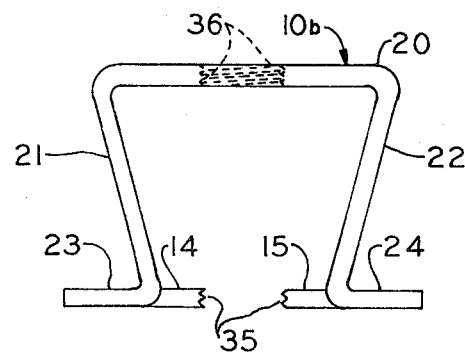
FIG. 9 is a view like FIG. 6, but showing another modified structure of the device.

Another variation of manufacture is illustrated in FIG. 9. As shown in FIG. 9 the plate 10b is shown to be made of thicker metal. In this manufacture, after the plate has been stamped to cut the opening, and bent to form the rib, the opening 11 may be tapped by inserting and turning the tapping tool upwardly through the plate, cutting threads 35 in the edges of the tabs 14 and 15 at the base of the rib, and then cutting the threads 36 at the top of the rib. When the screw is inserted upwardly through the opening 11 in the plate, the screw threads first engage an edge of opening 11 at the threads 35 in the edges of the tabs, and as the screw proceeds upwardly it engages the threads 36 at the top rib panel.

Whether the invention is embodied in the structure illustrated in FIG. 3, in FIG. 7, in FIG. 8 or in FIG. 9, I deem it of substantial advantage that the plate, which provides the toggles in each direction in my improved structure, is made of one piece, and the pivotal mounting of toggle members on a nut are avoided. Also it is an advantage that the use of a separate spring together with the difficulty of its assembly may be avoided. The device according to this invention can be manufactured at low cost, is strong and easy to use. It is believed to solve the need which has long existed in this art.

While in the embodiment described specifically herein it has been contemplated that the piece 10 be formed of sheet metal, this piece may be formed of any suitable metal such as steel, iron, aluminum, or alloys, and also may be formed of a plastic material which has elasticity such as to allow it to be deformed as herein described in order to permit it to pass through a wall opening and when the opening is passed to spring back toward its original form.

While I have illustrated and described only certain embodiments of the improved device and set forth only certain processes for its manufacture, it will be apparent to those skilled in the art that many embodiments may be constructed and that many changes may be made in its structure and in the process of its manufacture all within the spirit of the invention and the scope of the appended claims.

I claim:

1. A toggle fastening device comprising an elongated plate in which the central area is raised above the original plane of the plate to form a longitudinal rib having a top and spaced sides and providing side panels which extend in the original plane of the plate, a central opening in the top of said rib, an opening in each of the sides of said rib, each of said side openings being defined by a cut line extending from said top opening and downwardly to a point on a side panel and a cut line extending from said top line to a point on said side panel which point is spaced from said first mentioned point, tabs extending inwardly from said side panels toward the interior of said rib, said tabs being between and spaced from said points, said side openings being in communication with said top opening on opposite sides thereof whereby said plate is bendable at areas near said points to bring the ends of said plate forward each other to permit the plate to be inserted through a wall opening smaller than the length of the plate, and a screw in threaded engagement with said tabs and also in threaded engagement with the edges of said top opening when the ends of the plate are in a position of alignment.

2. A toggle fastening device is set forth in claim 1 in which said plate is resilient whereby said ends move outwardly after the plate has passed through said wall opening.

3. A device as set forth in claim 1 in which portions of said plate are turned downwardly at an angle on each side of said tapapening whereby said plate is brought tight against a planar surface said portions are moved toward conformity with such surface.

4. A device as set forth in claim 3 in which said plate is resilient whereby said portions resist being moved into such conformity and said portions keep said plate and said surface in tight contact.

5. A toggle fastening device as set forth in claim 1, in which said top opening includes a nut in threaded engagement with said screw, said nut being received in an enlarged opening in the rib said enlarged opening being of a form which corresponds to the outline of the outside of said nut whereby to hold said nut against turning when said screw is turned.

6. A toggle fastening device comprising a toggle plate in one piece, said plate having a central raised portion forming a rib having a top and sides, an opening centrally located in said top, a central opening in each of said sides communicating with said top opening and extending to the base of said rib whereby said plate is bendable to bring the ends of said plate toward each other to permit the plate to be inserted through a wall opening smaller than the length of said plate, tabs extending from said plate inwardly of said rib, and a screw in threaded engagement with the ends of said tabs, said screw being also in threaded engagement with the edges of said top opening when the ends of said plate are aligned, said sides of said rib being slanted inwardly of said rib toward the base of the rib whereby turning of said screw toward said top downwardly operates also to urge said tabs more tightly into engagement with said screw.

* * * * *